United States Patent [19]

Smillie, III

[11] Patent Number: 4,725,183
[45] Date of Patent: Feb. 16, 1988

[54] POWER-OPERATED LIFT AND PRESENTING MECHANISM

[75] Inventor: Charles M. Smillie, III, Ferndale, Mich.

[73] Assignee: C. M. Smillie & Company, Ferndale, Mich.

[21] Appl. No.: 17,922

[22] Filed: Feb. 24, 1987

[51] Int. Cl.⁴ ............................................. B65G 67/00
[52] U.S. Cl. .................................... 414/345; 414/462; 414/349; 414/541; 414/522; 414/495; 187/9 R; 187/24; 224/42.44; 224/310; 296/37.1; 296/26; 254/7 R; 254/9 R; 254/98
[58] Field of Search ............... 414/540, 541, 495, 462, 414/501, 608, 609, 610, 617, 660, 659, 661, 589, 522, 340, 343, 345, 349, 663; 254/7 R, 7 C, 9 R, 9 C, 98; 294/37.1, 26; 187/9 R, 24; 224/310, 273, 42.43, 42.44

[56] References Cited

U.S. PATENT DOCUMENTS

| | | |
|---|---|---|
| 2,091,069 | 8/1937 | Girl . |
| 2,094,401 | 9/1937 | Girl . |
| 2,454,566 | 11/1948 | Pfeiffer .............................. 414/522 |
| 2,890,908 | 6/1959 | McLean et al. ............... 414/540 X |
| 3,329,292 | 7/1967 | Haddock ....................... 414/522 X |
| 3,726,422 | 4/1973 | Zelin . |
| 4,221,528 | 9/1980 | Gordos . |
| 4,251,178 | 2/1981 | Bourgraf et al. . |
| 4,604,022 | 8/1986 | Bourgraf ........................ 414/462 X |
| 4,685,860 | 8/1987 | McFarland ..................... 414/462 X |

FOREIGN PATENT DOCUMENTS 2461629   3/1981   France ............................... 414/495

*Primary Examiner*—Frank E. Werner
*Attorney, Agent, or Firm*—Cullen, Sloman, Cantor, Grauer, Scott & Rutherford

[57] ABSTRACT

A portable power-operated lift and presenting mechanism has a base that is placed on the floor of an automobile trunk. A carriage moves between an elevated position and a lowered, transport position when a scissors jack connecting the carriage to the base respectively expands vertically and contracts vertically, expanding horizontally. The scissors jack is selectively power-operated, by a reversible electrical motor, to expand and contract vertically. The carriage has drawer slide assemblies on which is mounted a platform capable of supporting a heavy and bulky article. The platform is movable by the drawer slide assemblies, when the carriage is in an elevated position, between a retracted position in which the platform is generally over the base and within the trunk, and a presenting position in which the platform extends out from over the base, generally out of the trunk.

14 Claims, 11 Drawing Figures

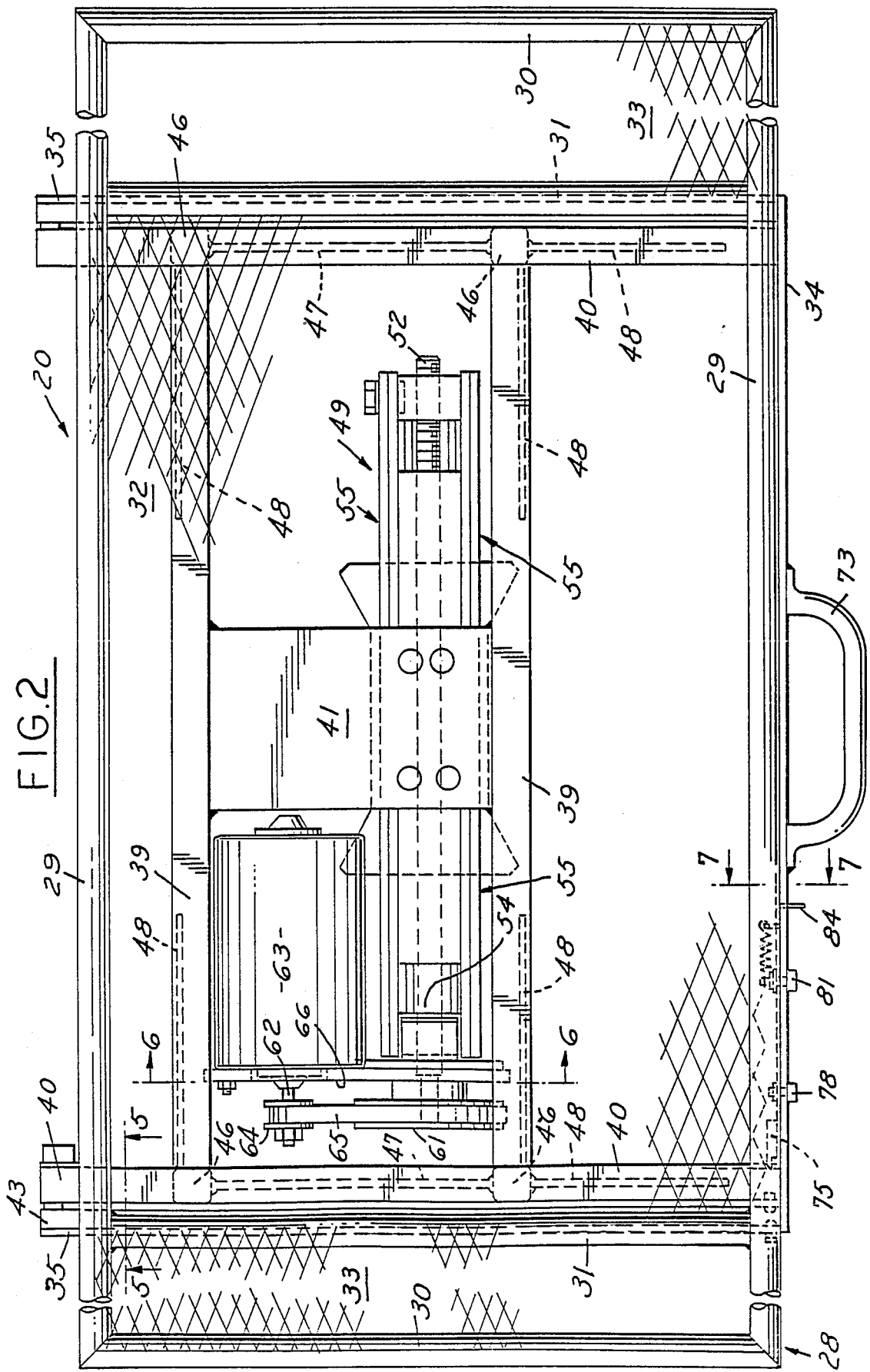

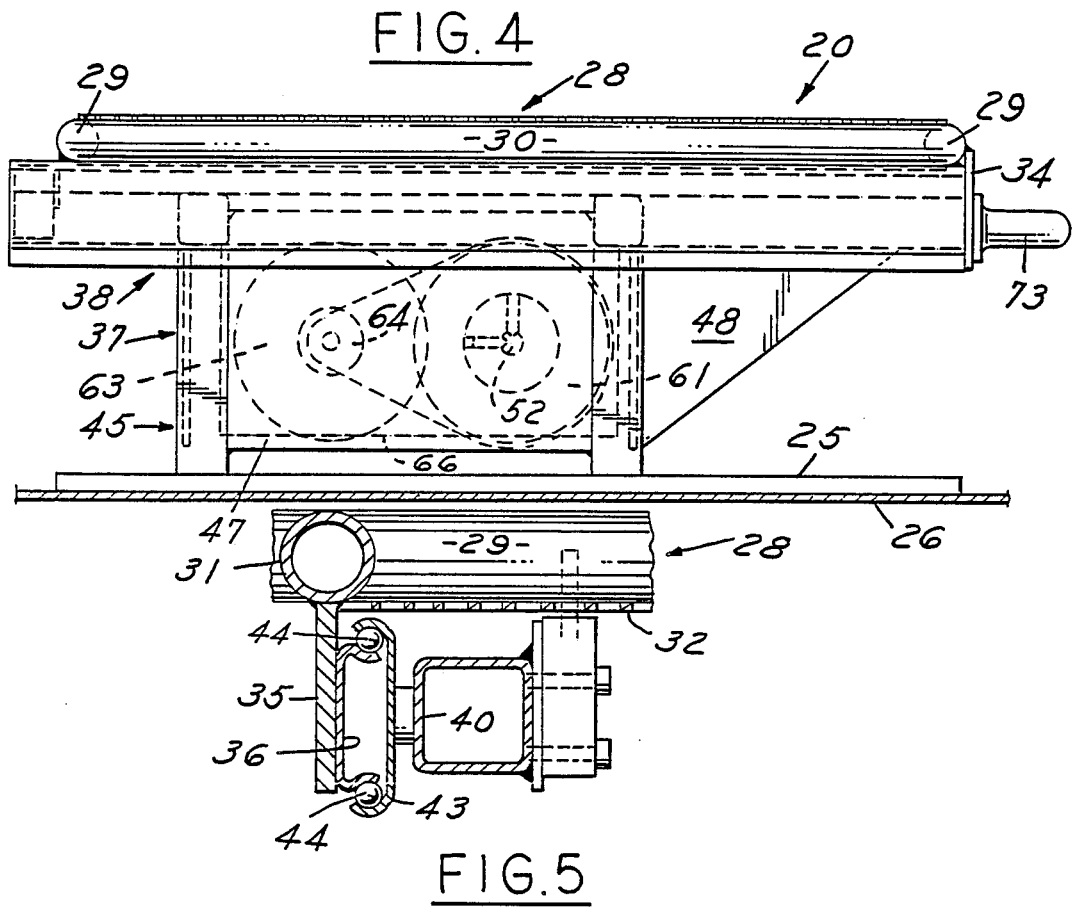
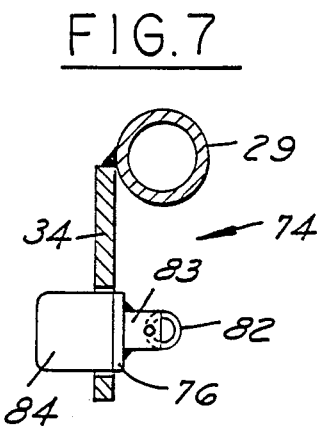
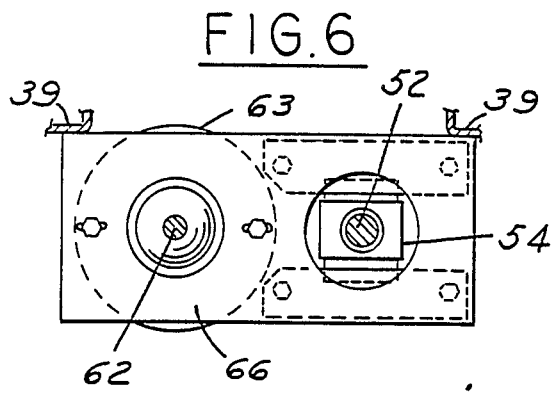

POWER-OPERATED LIFT AND PRESENTING MECHANISM

BACKGROUND OF THE INVENTION

I. Field of the Invention

The present invention relates generally to lift mechanisms for automobile trunks, and, more particularly, to power-operated lift and presenting mechanisms for use in assisting persons loading and unloading heavy and bulky articles to and from trunks of automobiles. Still more particularly, the invention relates to power-operated lift and presenting mechanisms, preferably of the portable type that can be put into an automobile trunk to translate a heavy and bulky article over the rear wall of an automobile trunk from a cart or the like, lower the article down into the trunk so that the lid may closed, subsequently lift the article up out of the trunk when the lid is opened, and translate the article back over the rear wall to be loaded onto a cart or the like.

II. Problems Solved by the Invention

As if designed by Aladdin's genie, the luggage compartments or trunks of many modern automobiles defy the outside compact proportions of the vehicles. But it is by no means owing to the magical paradox of the genie's lamp that automotive designers have managed to provide roomy trunks for relatively small-sized vehicles. For the most part, design achievement is simply the result of lowering the undercarriage in the vicinity of the trunk, raising the rear deck, and positioning the trunk lid to open essentially over the trunk. In effect, the trunk well is deepened.

The structured spaces of modern automobile trunk designs provide ample volumes into which heavy and bulky articles may be arranged. But, without the help of Aladdin's genie to load and unload the bulky articles, the advantageous volumes cannot be fully enjoyed. Specifically, the inconvenience of manipulating a bulky article, especially with the weight that usually accompanies bulk, is often beyond the abilities of a person given to the task of loading and unloading the heavy and bulky article, particularly a driver of small stature who is without the assistance of other passengers. A person would have to lift the article over the rear trunk wall and then gently down into the trunk to avoid damaging the article or the automobile. Thus, the driver or any other person loading a heavy or bulky article into the trunk of an automobile risks damage to the automobile and the article as well as physical strain or other injury to herself or himself.

III. Description of the Prior Art

Notwithstanding a need to provide for the special problems associated with loading and unloading heavy and bulky articles into modern deep well automobile trunks, efforts have been made to overcome the more general problems of loading and unloading automobile trunks. For example, U.S. Pat. No. 3,726,422, issued to Zelin, discloses a luggage rack that may be inserted into the rear of a station wagon body. Although the rack may be securely mounted above the floor or folded seats of the station wagon, it can be easily released to be taken out of the wagon. The rack includes a carriage which slides on a rack support through the rear door of the station wagon. By this means, the carriage can be brought to an extended position for placing and arranging luggage on and unloading luggage from the carriage. The carriage then can be slid back as the rack is brought to a retracted position within the station wagon.

The device has the obvious limitation of being structured for use in station wagons. This limitation precludes its use in the trunk of a vehicle where articles are to be let down into the trunk, rather than slid horizontally across the vehicle floor. Accordingly, the Zelin device operates as a disadvantage when compared to the present invention, considering the particular use for which the present invention is intended.

U.S. Pat. No. 2,091,069 and U.S. Pat. No. 2,094,401, both issued to C. Girl, disclose loading and unloading devices for the rear storage compartments of automobiles that are not station wagons, but the devices are nevertheless analogous in the Zelin device. All of the devices are essentially carriers that ride rail channels fixedly mounted to the platforms of vehicle luggage compartments. By manipulation readily available to a person desiring to load or unload an article strapped to the carrier of either of the Girl devices, the carrier is brought rearwardly from a position under the seat of the vehicle to the area under the trunk lid where it can be more easily loaded or unloaded by a person from either side of the vehicle.

Analogous to the shortcoming of the Zelin device, the relative greater ease and convenience of loading and unloading afforded by either Girl device, over the difficulty of reaching forwardly through the trunk to the area under the seat, falls short of providing a means of easily loading down into the well of a car trunk. Loading a cart or the like still would require having to bend over to lift a weight up from the floor of the trunk or the platform on the floor of the trunk, having to raise weight to the elevation at which it will sit on the cart or the like, and having to transport the weight to the cart. Aside from this important shortcoming, Girl also teaches that the devices must be fixedly mounted on the vehicle which adversely affects the portability of the devices.

U.S. Pat. No. 4,221,528, issued to Gordos, discloses a lifting device made up of a plurality of channel segments attached to the interior surfaces of the trunk lid of a passenger car, a bar that may be slid into the channel segments to project telescopically therefrom, and a block and tackle mechanism, together with a canvas or net sling, attached to the telescoped end of the bar. The block and tackle mechanism, together with the canvas or net sling, may be used to withdraw a heavy object located below the bar. The device further utilizes arm braces provided at the lateral edges of the trunk to transfer the load imposed on the trunk lid by the bar and channel arrangement to the body of the automobile as a triangulating arrangement.

This device calls for extensive modification of the interior of the trunk lid, but as a more significant disadvantage, the device depends on means beyond the invention disclosed by Gordos to lift or lower the heavy object from or to the floor of the trunk.

U.S. Pat. No. 2,890,908, issued to McLean et al., discloses a luggage compartment construction for vehicle bodies wherein a luggage compartment platform is a part of the unitary structure of a deck lid assembly that may be vertically elevated to a position permitting sidewise access to the platform underneath the trunk lid. The elevated platform provides greater ease of loading and unloading than at its unelevated position, which is closer to a standard elevation for a luggage compartment platform as the floor of the luggage compartment.

The McLean et al. elevating mechanism for the deck lid assembly is made up of a pair of laterally spaced apart scissors structures, each scissors structure with two legs pivotal with respect to one another about a pivot axis at the crossing of the two legs, and a jack screw assembly which actuates the pivoting. The pivot axis extends along a rod connecting the two structures; each leg is secured at one of its two ends to the underside of the platform and, at the other, to the vehicle structure. As the legs of each scissors approach becoming parallel in a vertical direction, the platform is elevated and, as they approach becoming parallel in a horizontal direction, the platform is lowered. The screw jack assembly includes a remotely operable reversible electrical motor. The structure is operated by remotely switching on the motor, preferably from the vehicle instrument panel, to rotate the screw of the jack in the direction that draws the legs of the structures toward becoming vertically parallel, thus elevating the platform, or to rotate the screw jack in a direction that draws the legs of the structures toward becoming horizontally parallel, thus lowering the platform.

Notwithstanding the elevated platform of the McLean et al. apparatus, there is still, in accordance with the teaching of McLean et al., the requirement that a person unloading or loading the platform bend over the side fenders of the vehicle to reach the article. Furthermore, McLean et al. does not teach or suggest means of translating the weight from the platform to a cart or the like. It is also the case that McLean et al. teaches that the apparatus, as well as the motor, are to be bolted or otherwise fixedly connected to the vehicle.

By far, the most advantageous apparatuses heretofore invented as a means of unloading heavy articles, from the standpoint of portability and presentment to a position for transference to a cart or the like, are disclosed in U.S. Pat. No. 4,251,178 (the '178 apparatus) and U.S. Pat. No. 4,604,022 (the '022 apparatus), both issued to Bourgraf. The Bourgraf apparatus are particularly adapted to unloading business machines and the like and are to be used in conjunction with a business machine cart for transporting and demonstrating the business machines.

The apparatus of the '178 patent, in particular, is a cart that has a wheel section and a handle section. The handle section is formed of a spaced apart pair of track along which a carriage for mounting a business machine is adapted to travel down to the foot of the cart. The foot of the cart is constructed like the platform of a dolly. A trunk loading attachment is provided that is comprised of a track-forming frame extension adapted to be connected to the upper end of the handle section, a base plate that is adapted to be positioned in the trunk, and an adjustable pivot support which mounts the base plate and to which the track-forming frame extension is pivotably mounted so that the carriage can be pushed up from the trunk, as it travels on the track of the frame extension, to the handle of the cart and down to the foot of the cart or unloading.

The '022 apparatus is a lifting mechanism to be placed in the trunk of a vehicle. There is a lift platform that is movable from a storage position within the trunk to an elevated position in which the lift platform projects outwardly from the trunk. The platform is raised by a lever mechanism that may be powered, according to this limited teaching, by a gas spring. The lift mechanism may be used with or without a cart.

While both of the Bourgraf apparatuses have portability as an object, only the lift mechanism of the '022 patent does not require it to be fixedly mounted in the trunk. The lift mechanism of the '022 patent also has the advantage of a power assist for lifting an article from the trunk. With regard to this latter advantage, however, the power assist disclosed in the '022 patent is not as easily controllable as the electric motor of the present invention and calls for an energizing means other than as provided in the standard power package of most automobiles.

IV. Objects of the Invention

Accordingly, it is the primary object of the present invention to provide a lift mechanism that can carry a heavy and bulky article over the rear wall of an automobile trunk from a cart or the like, lower the article down into the trunk so that the lid can be closed, subsequently lift the article up out of the trunk when the lid is open, and translate the article back over the rear wall to be presented for loading onto a cart or the like.

It is the further object of this invention to provide a lift mechanism that is power-operated at least to perform the lifting and lowering operations involved in loading and unloading heavy or bulky articles into and out of an automobile trunk.

Still further, it is an object of the invention to provide a power-operated lift and presenting mechanism for automobile trunks that is portable so that it can be carried to the rear wall of an automobile trunk, lifted up and put into the trunk, and made ready to perform the task of lifting and lowering a heavy and bulky article and translating the artile over the rear wall of the trunk.

An additional object of the invention is to provide a power-operated lift and presenting mechanism, for automobile trunks, made up of a combination of easily assembled and readily available parts, including a commercially available scissors mechanism that can be used to lift and lower a heavy or bulky article.

V. Summary of the Invention

In accordance with the present invention, a power-operated lift and presenting mechanism has a base adapted to be seated on the floor of the trunk of an automobile. A carriage includes a rigid, generally rectangular upper structure that is disposed parallel to and in spaced relationship with the base.

The upper structure of the carriage is essentially made up of interconnecting structural beams, including two longitudinal beams and two transverse beams. The two longitudinal beams extend between the two transverse beams, with the two transverse beams extending between and beyond their connections with the longitudinal beams. Also extending between and connected to intermediate portions of the two longitudinal beams is a bearing plae. Two drawer slide assemblies, each having a sliding channel which rides on ball bearings within a guide chanel, extend parallel to the transverse members, each of which is connected to a respective transverse beam. The sliding channel may be moved back and forth within the guide channel so that it moves from a position in which it is congruent to the guide channel to a position in which it extends from the guide channel.

The carriage also includes a lower structure made up of four structural columns of substantially equal length. All of the structural columns are perpendicular to the base. Each of the structural columns is rigidly connected to the upper frame proximate to a respective juncture of longitudinal and transverse members. Thus situated, the lower structure is adapted to vertically space the upper frame from the base and to transfer a load borne by the upper frame to the base.

A platform has a generally rectangular outer perimeter and a rigid frame that includes two generally parallel longitudinal members, two generally parallel outer transverse members, and two generally parallel inner transverse members. The outer transverse members are perpendicular to the two longitudinal members and are connected to the two longitudinal members at the extremities thereof to form the generally rectangular outer perimeter of the platform. The two inner transverse members are also perpendicular to the two longitudinal members, but are connected to the two longitudinal members at intermediate portions thereof to form a generally inner rectangular perimeter. Each more adjacent outer transverse member and inner transverse member form with end portions of the longitudinal members a generally rectangular wing perimeter adjacent the inner perimeter and to either transverse side thereof. A recessed floor is connected to the underside of the two longitudinal members and the two inner transverse members to cover the area within the generally rectangular inner perimeter. Two elevated floors are disposed over the area within the generally rectangular wing perimeters. Each elevated floor is connected to the top side of the two longitudinal members, the outer transverse member, and the inner transverse member.

The platform has a transverse facing plates rigidly edge-mounted to each inner transverse member. Each transverse facing plate extends the length of the inner transverse member and projects downwardly from the inner transverse member. The transverse facing plate are rigidly mounted adjacent to the sliding channels of the drawer assemblies. As a consequence, the platform is movable between a retracted position in which the sliding channels are generally congruent with the guide channels which are rigidly attached to the upper structure of the carriage and a presenting position in which the sliding channels extend substantially out from the guide channels and the carriage.

The scissors mechanism of the power-operated lift and presenting mechanism is a scissors jack that is connected between the base and the lift carriage by being bracketed to the base and to the bearing plate of the lift carriage. The scissors jack has a jack screw that is pivotal about its axis of extension. A pair of transversely spaced apart scissors structures are operably connected to the jack screw so that, when the jack screw pivots in a first rotational direction, the scissors structures expand along a direction perpendicular to the upper structure and the base, thereby separating the upper structure from the base, and, when the jack screw pivots in a second rotational direction, the scissors structures expand in a direction parallel to the base and the upper structure of the carriage resulting in a decrease of the distance between the upper carriage and the base.

The jack screw is operably connected to the drive shaft of a reversible electric motor by means of a drive belt trained around pulleys on the drive shaft and the jack screw, respectively. A switch actuates the motor to pivot the drive shaft in one rotational direction, when the platform is to be raised, and for actuating the motor to pivot the drive shaft in an opposite direction when the platform is to be lowered.

Advantages and meritorious features of the power-operated lift and presenting mechanism will be fully understood with the following description of the preferred embodiment, the appended claims, and the drawings. A brief description of the drawings follows.

BRIEF DESCRIPTION OF THE DRAWINGS

FIG. 2 is a top plan view of a power-operated lift and presenting mechanism incorporating the present invention, as viewed with the base of the power-operated lift and presenting mechanism seated on the floor of an automobile trunk.

FIG. 4 is an elevational view of the invention that is orthogonal to the view shown in FIG. 3, with a phantom of the pulley and drive belt arrangement of the motor and jack assembly.

FIG. 5 is a sectional view taken substantially on the line 5—5 of FIG. 2.

FIG. 6 is a sectional view taken substantially on the line 6—6 of FIG. 2.

FIG. 7 is a sectional view taken substantially on the line 7—7 of FIG. 2.

DETAILED DESCRIPTION OF THE PREFERRED EMBODIMENT

Figure 1:
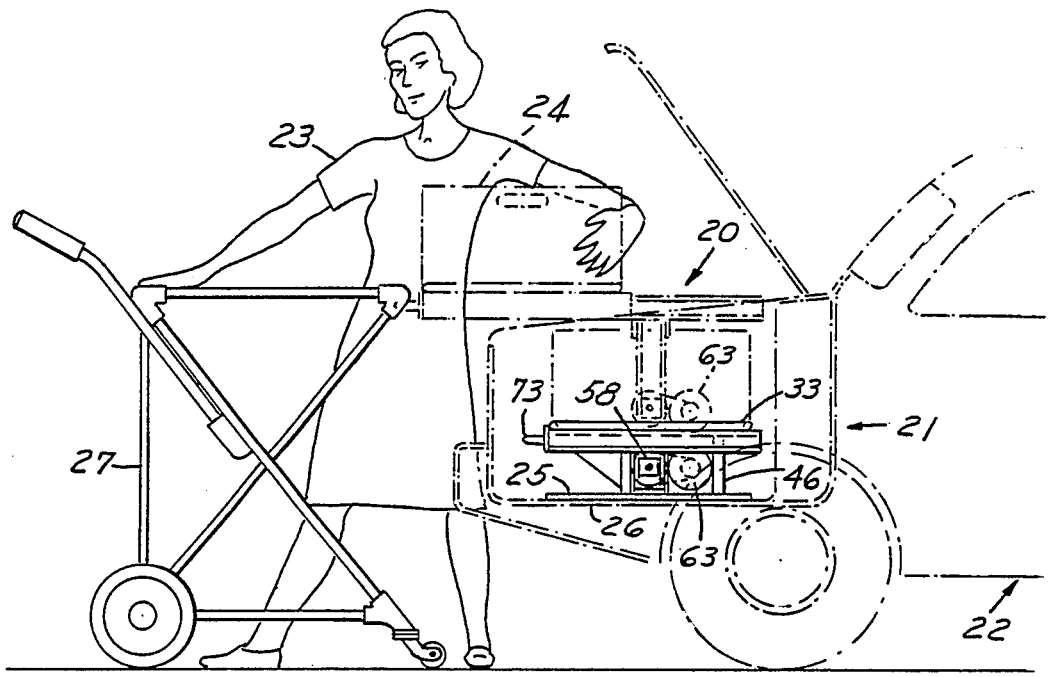
FIG. 1 is a phantom view of the rear portion of an automobile body with the invention contained in the trunk of the automobile, showing how a driver would make use of the invention to unload a heavy and bulky article.

Turning first to FIG. 1, a power-operated lift and presenting mechanism 20 in accordance with the present invention is shown in a trunk 21 of an automobile 22. As is it to be used to assist a peson 23 to load or unload a heavy and bulky article 24, perhaps, though not necessarily, to assist the driver of the automobile 22, power-operated lift and presenting mechanism 20 is oriented with its base 25 seated on the floor 26 of trunk 21. Heavy and bulky article 24 is being unloaded from power-operated lift and presenting mechanism 20 onto a cart 27, or the like, or loaded onto power-operated lift and presenting mechanism 20 from cart 27.

Figure 3:
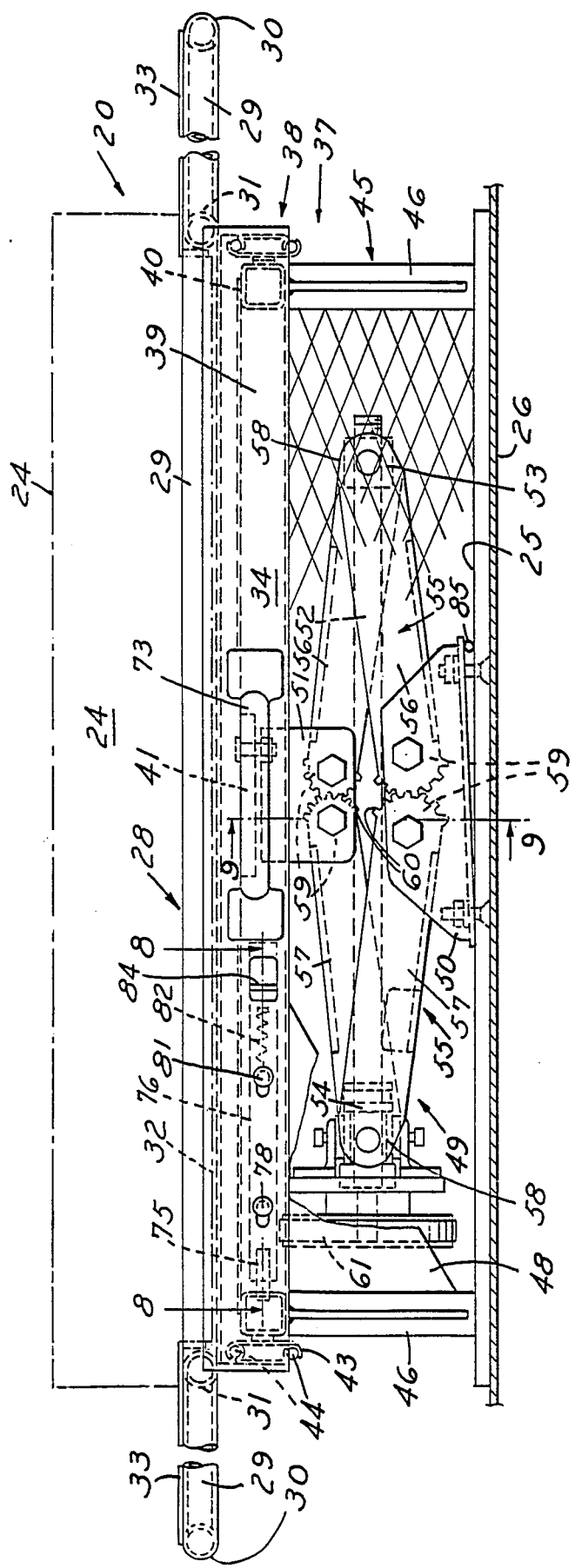
FIG. 3 is an elevation of the invention as viewed from the side of the lift on which a carrying handle is situated.

Turning now to FIGS. 2 and 3, a platform 28, on which heavy and bulky article 24 is loaded in FIG. 1, is shown in greater detail. Platform 28 is seen as having a generally rectangular outer perimeter rigidly framed by two generally parallel longitudinal frame members 29 and two generally parallel outer transverse frame members 30. Outer transverse frame members 30 are joined perpendicularly to longitudinal frame members 29 at the extremities of the frame members to form miter bends with welded joints. In this way, the outer perimeter is framed by parts of a rigid unitary structure.

Inner transverse frame members 31 are joined perpendicularly to longitudinal frame members 29 with the extremities of inner transverse frame members 31 welded to intermediate sectors of longitudinal frame members 29 to form welded T-joints complementing the rigid unitary structure. Inner transverse frame members 31 and the portions of longitudinal frame members 29 disposed between inner transverse frame members 31 accordingly fashion a generally inner rectangular perimeter. In addition, there are two wing perimeters, each formed with two parallel sides consisting of an outer transverse frame member 30 and an inner transverse frame member 31 that are proximate to one another and two parallel sides consisting of the portions of longitudinal frame members 29 spanning between the proximate pair of outer transverse frame member 30 and inner transverse frame member 31.

Longitudinal frame members 29, outer frame members 30, and inner frame members 31 preferably are all lightweight steel structural tubing having sufficient strength for supporting the heavy and bulky articles 24 mentioned in connection with FIG. 1. As an example of tubing meeting these specifications, 21 gage steel round tubing is suggested.

Platform 28 has a recessed floor 32 which covers the area within the general rectangular inner perimeter bounded by inner transverse frame members 31 and the portions of longitudinal frame members 29 that extend between inner transverse frame members 31. Preferably, recessed floor 32 is of an expanded metal construction selected for its strength and lightweight properties. Recessed floor 32 is connected to the underside of the portions of longitudinal frame members 29 and inner transverse frame members 31 that form the generally inner rectangular perimeter. For the preferable metal construction, the connections are by spot welding.

Platform 28 also has two elevated floors 33 covering the two separate areas within the outer perimeter, as shown in FIG. 2, that remain to be covered. These are the two areas, within the two wing perimeters, each of which is bounded by a set of proximate outer and inner transverse frame members 30 and end portions of longitudinal frame members 29 between the set of outer and inner transverse frame members 30, 31. Elevated floors 33 are connected to the top side of longitudinal frame members 29 and the corresponding set outer and inner frame members 30, 31, in welded construction similar to the construction of floor 32. With respect to the primary use orientation of the power-operated lift and presenting mechanism 20, the underside mounting of recessed floor 32, relative to the top side mounting of elevated floors 33 is what characterizes the floor 32 as being "recessed". Floors 33 are comparatively "elevated".

Turning for a moment to FIG. 7, which is a drawn to a detail to be later discussed but which also shows a feature to be now explained, a longitudinal facing plate 34 is weld-mounted rigidly, although tangentially, to one of the longitudinal frame members 29, so that longitudinal facing plate 34 projects downwardly from the longitudinal frame member 29 to which longitudinal facing plate 34 is mounted. As can be seen in FIGS. 2 and 3, longitudinal facing plate 34 extends between transverse frame members 31. Also in accordance with the primary use orientation, longitudinal facing plate 34 is situated in what is considered to be the front of the power-operated lift and presenting mechanism 20. It follows that the rear longitudinal frame member 29 does not have a longitudinal facing plate 34 welded to it.

Two transverse facing plates 35 are represented by hidden lines in FIGS. 2 and 3, but are shown in detail in FIG. 5, to which section marks in FIG. 2 refer. FIG. 2 shows that each transverse facing plate 35 extends from an end abutting longitudinal facing plate 34 at one longitudinal frame member 29 to an end that is beyond the other longitudinal frame member 29. Transverse facing plate 35 also extends contiguously with a sliding channel 36, as can be seen in detail in FIG. 5. Transverse facing plate 35 is connected to sliding channel 36 to provide a movable support for platform 29 as will explained later. FIG. 5 also shows transverse facing plate 35 as rigidly edge-mounted, as for example by welded connection, to an inner transverse frame member 31 so that transverse facing plate 35 projects downwardly from the inner transverse frame member 31.

Referring once again to FIGS. 2 and 3, a carriage 37 is shown disposed beneath platform 29. Carriage 37 has a rigid, generally rectangular upper structure 38 that is disposed parallel to base 25, which was referred to in the description of FIG. 1. Upper structure 38 is preferably made up of interconnecting tubular structural members, in this case chosen for rigidity of connections and the stability of the structure, as well as for strength and light weight. An example of a structural member meeting this criteria is 14 gage square tubing.

Included in upper structure 38 are two longitudinal beams 39 which extend between two transverse beams 40. The two transverse beams 40 correlatively extend between and beyond their welded connections with the longitudinal beams. A bearing plate 41, shown in FIG. 9, extends between the two longitudinal beams 39 of upper structure 38 and is connected, preferably welded, to an intermediate portion of each longitudinal beam 39.

Upper structure 38 further includes two drawer slider assemblies 42. Each drawer slide assembly 42 includes, as a structural component, one of the sliding channels 36, shown in FIG. 5, to which one of the transverse facing plates 35 is connected. Each drawer slide assembly 42 also has a guide channel 43 rigidly connected by conventional means, as for example screw or bolt fasteners, to one of the transverse beams of the upper structure 38. Guide channel 43 extends parallel to the transverse beam member to which it is connected.

Each sliding channel 36 rides on ball bearings 44 within guide channel 43 to slide along guide channel 43 from a position in which sliding channel 36 is generally congruent with guide channel 43 to a position in which sliding channel 36 extends substantially out from guide channel 43. As should be appreciated in regarding the explanation of how platform 28 is connected to both sliding channels 36 by means of transverse facing plates 35, platform 28 moves between two positions. A first position, the "retracted position", corresponds to sliding channels 36 being generally congruent with guide channels 43. A second position, the "presenting position", corresponds to sliding channels 36 extending substantially out from guide channels 43.

Carriage 37 has a lower structure 45 which is made up of four columns 46 of generally equal length disposed perpendicularly to base 25. Each column 46 is rigidly connected to upper structure 38. Again, the preferred connection is by welding, and, preferably, the connection is proximate to a respective juncture of a longitudinal beam 39 and a transverse beam 40. With columns 46 so disposed, upper structure 38 is vertically spaced from base 25 when columns 46 rest on base 25. Accordingly, when columns 46 rest on base 25, a load borne by upper structure 38 is transferred to base 25, but, as will be shortly explained, columns 46 are not always in contact with base 25.

Included in lower structure 45 are six bracing plates which structurally strengthen columns 46 in their perpendicular orientation with respect to beams 39, 40 of upper structure 38. Each of the bracing plates 47, 48 has one edge which extends along and is welded to one of the beams 39, 40 of upper structure 38. The edges of bracing plates 47, 48 that are orthogonal to the edges that are welded to beams 39, 40 are welded to columns 46 and extend along columns 46 short of the length of columns 46, such that bracing plates 39, 40 are disposed in spaced relation to base 26 when columns 46 rest on base 25. In the preferred embodiment, rectangular brace plates 47, of which there are two, each has its one edge welded to a respective transverse beam 40, between columns 46. Two triangular brace plates 48 each have their one edge also welded to a respective transverse beam, but on that portion of the beam between column 46 and the front of the power-operated lift and presenting mechanism 20. Two other triangular brace plates 48 each has its one edge welded to the rear longitudinal beam 39 between columns 46 and its other welded edge extending along a respective one of columns 46.

Figure 11:
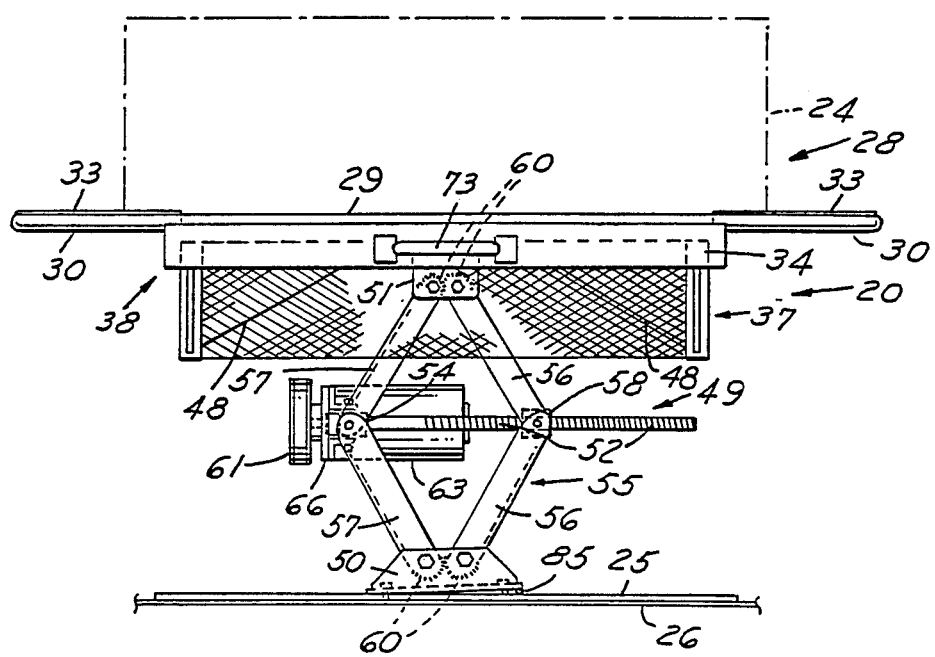
FIG. 11 is an enlarged view of the invention in a vertically extended position.
Figure 9:
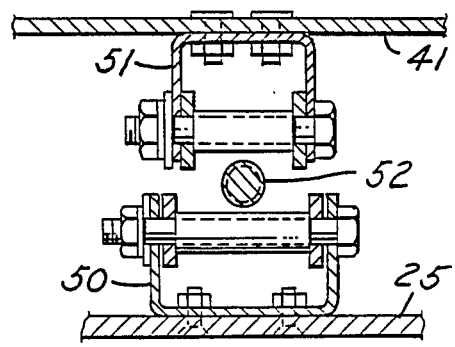
FIG. 9 is a sectional view taken substantially on the line 9—9 of FIG. 3.

An important feature of the invention is the scissors jack 49 shown in FIGS. 2 and 3, as well as in FIG. 11. Scissors jack 49 is a power-operated lift for actuating carriage 37 to move upwardly from a position, designated as the transport position, in which upper structure 38 is vertically spaced from base 25 by columns 46 resting on base 25. Scissors jack 49 is attached to base bracket 50 which is anchored rigidly to base 25 by conventional bolt and nut fasteners as shown in FIG. 9. Base bracket 50 is adapted to project upwardly from the base to provide a length for its connection with operative parts of scissors jack 49. A carriage bracket 51 is rigidly anchored to bearing plate 41 of carriage 37 in a manner similar to the anchorage of base bracket 50 to base 25, except that bracket 51 is adapted to project downwardly from the carriage 37. Through means of base bracket 50 and carriage bracket 51 respectively connecting base 25 and carriage 37 to scissors jack 49, scissors jack 49 connects upper structure 38 of carriage 37 to base 25 and operates in one mode to increase the distance between upper structure 38 and base 25 and in another mode to decrease the distance, both of which modes will now be explained in connection with the structure of scissors jack 49.

Actuation of scissors jack 49 is brought about by the pivoting motion of a jack screw 52 about its axis of extension. Jack screw 52 has threads extending substantially along its length. The threads are engaged by a thread-driven member 53 into which jack screw 52 has been received. When jack screw 52 pivots, thread-driven member 53 is displaced along the extension of jack screw 52. Jack screw 52 also extends through a bearing member 54, but is free to rotate without affecting the displacement of bearing member 54. Correlatively, bearing member 54 may be displaced along the extension of jack screw 52 without being directly influenced by the rotation of jack screw 52.

A pair of scissors assemblies 55, shown clearly in FIGS. 3 and 11, are juxtaposed to one another diametrically across jack screw 52, as can be seen in FIG. 2. With regard again to FIGS. 3 and 11, it can be seen that each scissors assembly 55 has four legs 56, 57 of substantial equal length. Each of the legs 56, 57 has a displacment end 58 and a gear end 59. Gear end 59 of one leg 56, 57 includes gear teeth 60 which mesh with gear teeth 60 of another leg, 56, 57. Two legs of each scissors assembly 55 are driving legs 56, their displacment ends 58 being pivotally connected to thread-driven member 53. The other two legs of each scissors assembly 55 are driven legs 57, their displacement ends 58 being pivotally connected to bearing member 54, which, as may be recalled, may be displaced along the extension of jack screw 52 without regard to the rotation of jack screw 52. One of the driving legs 56 and one of the driven legs 57 of each scissors assembly 55 have their respective gear ends 59 pivotally connected to base bracket 50, and one of the driving legs 56 and one of the driven legs 57 of each scissors assembly 55 have their respective gear ends 59 pivotally connected to carriage bracket 51. Gear teeth 60 on driving legs 56 are intermeshed with gear teeth 60 on driven legs 57.

When jack screw 52 pivots in a first rotational direction, let us arbitrarily take a counterclockwise direction, the disclosed structure of power-operated lift and presenting mechanism 20 results in the displacement ends 58 of driving legs 56 being translated with thread-driven member 53 along jack screw 52 parallel to and inwardly of base 25, platform 28, and upper structure 38. As gear end 59, of the driving leg 56 that is pivotally connected to base bracket 50, is not free to be so translated because of the connection of base bracket 50 to base 25, driving leg 56 rotates toward the vertical. Concomitantly, the driven leg 57 that is pivotally connected to base bracket 50 and geared to rotate with driving leg 56 rotates toward the vertical, pulling bearing member 54, to which driven leg 57 is also pivotally connected, inwardly toward threaded member 53. Consequently, the driven leg 57, that is pivotally connected to carriage bracket 51 and also to bearing member 56 and whose translation along the direction of the translation of bearing member 56 is resisted by driving leg 56, rotates toward the vertical. Finally, the driving leg 56 that is pivotally connected to carriage bracket 51 and geared for rotation with driven leg 57 rotates toward the vertical. When jack screw 52 pivots in an opposite direction, which consistent with the adopted convention in this description of the preferred embodiment is in the clockwise direction, driving legs 56 and driven legs 57 rotate opposite their rotations as described above with the consequence that the driving legs 56 and driven legs 57 rotate toward the horizontal. Accordingly, rotation of jack screw 52 in a counterclockwise direction causes scissors jack 49 to expand vertically, and rotation of jack screw 52 in the clockwise direction causes scissors jack 49 to expand horizontally. In connecting upper structure 38 of carriage 37, to which platform 28 is in a fixed vertical spatial relationship, to base 25, scissors jack 49 respectively increases and descreases the distance between platform 28 and base 25. When base 25 is seated on the floor of an automobile trunk, as for example floor 26 in trunk 29 of automobile 22 illustrated in FIG. 1, an increase of the distance between platform 28 and base 25 elevates platform 25; conversely, a decrease in the distance between the platform 28 and base 25 lowers platform 28.

In accordance with another feature of the invention shown in FIGS. 2 and 4, a jack-driving pulley 61, shown in FIG. 4 by hidden lines behind rectanglar brace plate 47, is mounted on jack screw 52. Rotation of jack-driving pulley 61 causes jack screw 52 to pivot. This rotation is accomplished by linkage between jack-driving pulley 61 and a pivotal drive shaft 62 of a reversible electric motor 63. A drive pulley 64, which is mounted on drive shaft 62 of electric motor 63, rotates with drive shaft 62, so that, when a drive belt 65 is trained around both jack-driving pulley 61 and drive pulley 64, jack-driving pulley 61 rotates with drive pulley 64. Referring to FIG. 6, a mounting plate 66 is provided to mount motor 63 so that it will always be adjacent to jack screw 52, travelling with jack screw 52 as jack screw 52 is elevated or lowered.

Figure 10:
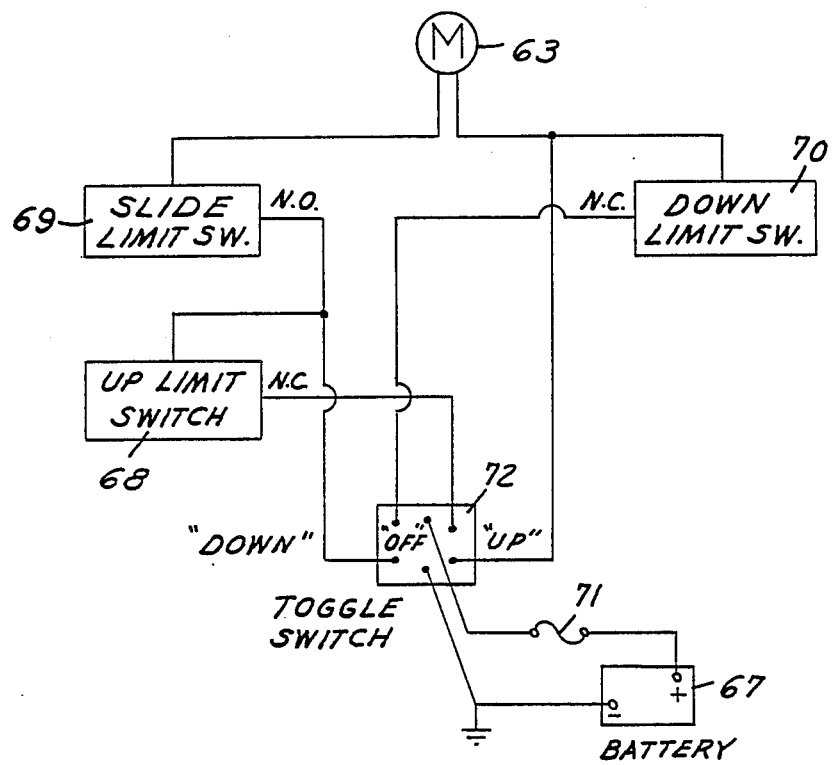
FIG. 10 is an electrical schematic of the power means of the invention.

Referring to FIG. 10, a battery 67 for providing direct current to electric motor 63, is shown in a circuit arrangement that has limit switches 68, 69, 70, a fuse 71, and a toggle switch 72. When toggle switch 72 is flipped to "up" position, as schematically indicated in FIG. 10, an up limit switch 68 and slide limit switch 69 are closed, a circuit is completed for powering drive shaft 62 of motor 63 in the direction that drives platform 28 upwardly in the manner that has been described earlier. Slide limit switch 69 is closed when platform 28 is in the retracted position, and up limit switch 68 is closed when the distance between platform 28 and base 25 has not reached a predetermined maximum. When toggle switch 72 is flipped to "down" position, as schematically indicated in FIG. 10, and down limit switch 70 and slide limit switch 69 are closed, a circuit is completed for powering drive shaft 62 of motor 63 in the direction that drives platform 28 downwardly in the manner that has been described earlier. Down limit switch 70 is closed when lower structure 45 of carriage 38 is not in contact with base 25. When any of the limit switches 68, 69, 70 are open or the toggle switch 72 is an "off" position, which is a position between "up" and "down" positions, the circuits are open and motor 63 is not in operation.

Toggle switch 72 may be located at any of a number of convenient locations, depending on features of the automobile 22. For example, in an automobile having an automatic trunk lid opener, toggle switch 72 may be located near a control for opening the trunk lid. In an automobile which requires one to walk to the rear of the automobile to open the trunk, toggle switch 72 may be in the trunk or on the power-operated lift and presenting mechanism 20.

A number of other features provide for the portability of the present invention. First, the invention is made of lightweight metal components, as for example, aluminum components. Second, a handle 73, as shown in FIGS. 2, 3 and 4, may be attached by conventional means, such as screws received in holes in longitudinal facing plate 34. Third, an electrical plug may be used to tap into a circuit powered by battery 67, so that the plug may be inserted into a socket in trunk 21 of FIG. 1 when power-operated lift and presenting mechanism 20 are placed in trunk 21, and the plug may be pulled from the socket to free the power-operated lift and presenting mechanism 20 which may then be taken from the trunk 21.

Figure 8:
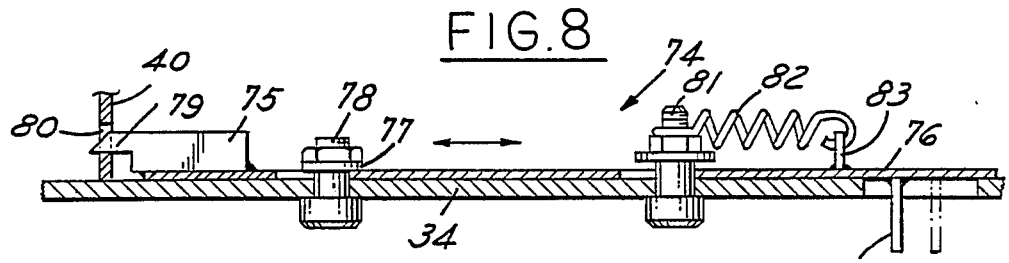
FIG. 8 is a sectional view taken substantially on the line 8—8 of FIG. 7.

A fourth feature of the present invention facilitating its portability is a latching mechanism 74, as illustrated in FIGS. 7 and 8, that prevents platform 28 from sliding, relative to carriage 37, into the presenting position while power-operated lift and presenting mechanism 20 is being carried by handle 73. Latching mechanism 74 comprises a latch member 75, which is welded to a slide plate 76. Slide plate 76 is disposed in contiguous alignment with longitudinal facing plate 34 and held in such juxtaposition by a slide washer 77 on a guide screw 78. Slide washer 77 presses slide plate 76 to longitudinal facing plate 34, while allowing slide plate 76 to move relative to longitudinal facing plate 34 along the longitudinal direction of longitudinal facing plate 34. The relative movement of slide plate 76, with respect to longitudinal facing plate 34 and the structural components of carriage 37 structure, brings an extension 79 of latch member 75 into and out of an opening 80 in transverse beam 40. An anchor screw 81 helps guide and hold slide plate 76 in alignment with longitudinal facing plate 34. Anchor screw 81 also anchors one end of an extension spring 82. The other end of extension spring 81 is connected to slide plate 76 at an anchor arm 83 welded to slide plate 76, with the result that extension spring 82 biases slide plate 76 toward a posture in which extension 79 is received by opening 80. This positions slide plate 76 in a latching posture. It is to be appreciated that opening 80 is not available for extension 79 to tenter unless platform 28, including longitudinal facing plate 34, is in the retracted position. Once slide plate 76 is in the latching posture and platform 28 is in the retracted position, platform 28 is prevented from sliding to the presenting position until a thumb plate 84 is pushed to slide slide plate 76 away from its latching posture.

Power-operated and presenting mechanism 20 may be constructed using commercially available components. In particular, scissors jack 49 may consist of a commercially available product requiring only minor adaptations for use in power-operated lift and presenting mechanism 20. For example, base bracket 50 of the commercially available product might have to be shimmed with, as an example, a small diameter metal rod 85, as shown in FIG. 3, in order to align jack screw 52 so that it is parallel to base 25.

As should now be apparent, the present invention provides a power-operated lift and presenting mechanism that can be used for loading and unloading heavy and bulky articles from an automobile trunk. The power-operated lift and presenting mechanism 20 may be placed in the trunk when such loading and unloading is anticipated and may be taken from the trunk to provide additional room in the trunk for articles not presenting problems with loading and unloading the articles. As compared with prior art structures, the power-operated lift and presenting mechanism 20 is relatively simple and easy to use and may be constructed of commercially available components with relatively simple adaptations. The power-operated lift and presenting mechanism 20 has the advantage that is adapted to be used with substantially any conventional part to or from which a heavy and bulky article may be transferred.

What is claimed is:

1. A power-operated lift and presenting mechanism for conveniently loading and unloading articles to and from the trunk of an automobile, the power-operated lift and presenting mechanism comprising:
a base adapted to be seated on the floor of the trunk;
a carriage having an upper structure including track means disposed generally in a plane parallel to the base and a lower structure disposed between the upper structure and the base, the lower structure adapted to vertically space the upper structure from the base and to transfer a load borne by the upper structure to the base when the base is seated on the floor of the trunk and the carriage is in a transport position, the upper structure movable from the transport position to an elevated position and from the elevated position to the transport position;
a platform having track follower means engaged by the track means and adapted to be disposed in a retracted position over the base when the base is seated on the floor of the trunk and to be movable to and fro along the trunk means between the retracted position and a presenting position in which the platform is substantially out from over the base; and a power-operated mechanism for actuating the carriage upwardly from the transport position to the elevated position and downwardly from the elevated position to the transport position, the platform being in a retracted position when the carriage is so moved;

whereby, when the base is seated on the floor of the trunk and the carriage is in the elevated position, the platform may be moved to a presenting position in which the platform projects out from the trunk so that articles may be conveniently loaded and unloaded at an elevation convenient for sliding the articles from and to a hand cart or the like.

2. A power-operated lift and presenting mechanism as described in claim 1 wherein the upper structure of the carriage is rigidly connected to the lower structure.

3. A power-operated lift and presenting mechanism as described in claim 2 wherein the upper structure of the carriage includes interconnecting longitudinal and transverse structural beams and wherein the lower structure includes a plurality of structural columns disposed perpendicularly to the base.

4. A power-operated lift and presenting mechanism as described in claim 2 wherein the structural beams and structural columns are tubular structural members.

5. A power-operated lift and presenting mechanism as described in claim 4 wherein the tubular structural members are aluminum and the base is an aluminum plate.

6. A power-operated lift and presenting mechanism as described in claim 1 wherein the power-operated mechanism includes a scissors jack bracketed to the upper structure of the carriage and bracketed to the base, and power means for actuating the scissors jack to move the carriage away from the base when the carriage is moved toward the elevated position and toward the base when the carriage is moved toward the transport position.

7. A power-operated lift and presenting mechanism as described in claim 6 wherein the power means includes an electric motor having a shaft that pivots in a first rotational direction to actuate the scissors jack to move the carriage away from the base when the carriage is moved toward the elevated position and that pivots in a second rotational direction to move the carriage toward the base when the carriage is moved toward the transport position.

8. A power-operated lift and presenting mechanism as described in claim 7 wherein the power means further includes an actuation switch, an up limit switch, a down limit switch, a slide limit switch, and a circuit connected to the actuation switch, the up limit switch, the down limit switch, and the electric motor, the actuation switch being capable of closing the circuit when the slide switch and up limit switch are closed and the actuation switch being capable of closing the circuit when the slide limit switch and the down limit switch are closed, the slide limit switch being closed when the platform is in a retracted position, the up limit switch being closed when the platform is not in the elevated position, and the down limit switch being closed when the carriage is not in the transport position.

9. A power-operated lift and presenting mechanism as described in claim 1 wherein the platform includes a platform floor and a platform frame supporting the floor, the platform frame being connected to the track means.

10. A power-operated lift and presenting mechanism as described in claim 9 wherein the platform floor is an expanded metal floor.

11. A power-operated lift and presenting mechanism as described in claim 1 further comprising a handle connected to the upper structure of the carriage for transporting the power-operated lift and presenting mechanism to and from the trunk of the automobile.

12. In a power-operated lift and presenting mechanism for conveniently loading and unloading heavy and bulky articles respectively to and from a trunk of an automobile, the combination comprising:

a base adapted to be seated on the floor of the trunk;

a carriage having an upper structure including track means disposed generally in a plane parallel to the base and movable between a transport position proximate to the base and an elevated position remote from the base;

a platform having a track follower means and being connected to the upper structure of the carriage by the track follower means engaging the track means, so that the platform is movable with the upper structure between the transport position and the elevated position, the platform adapted to be disposed in a retracted position over the base when the base is seated on the floor of the trunk and to be movable to and fro along the track means between the retracted position and a presenting position in which the platform is substantially out from over the base;

a scissors jack connecting the upper structure of the carriage to the base, the scissors jack having a jack screw adapted to rotate in a first rotational direction to increase the distance between the upper structure and the base, and in a second rotational direction to decrease the distance between the upper structure and the base; and a reversible electric motor for actuating the jack screw, whereby, when the base is seated on the floor of the trunk with the carriage in the transport position, the jack screw may be rotated in the first direction, lifting the platform to the elevated position whereat the platform may be moved to the presenting position for convenience in loading and unloading heavy and bulky articles to and from the platform, and, after the platform is moved back to the retracted position, the jack screw may be rotated in a second direction, lowering the platform to the transport position in which the power-operated lift and presenting mechanism may be conveniently taken from the trunk or transported therein.

13. In an automobile having a trunk with a trunk floor, a portable power-operated lift and presenting mechanism placed on the automobile trunk floor, the portable power-operated lift and presenting mechanism comprising:

a base seated on the trunk floor;

a carriage including a rigid, generally rectangular upper structure disposed parallel to the base and movable between an elevated position and a lowered, transport position, the upper structure made up of interconnecting structural beams including two longitudinal beams extending between two transverse beams, the two transverse beams extending between and beyond their connections with the longitudinal beams, the carriage also including a bearing plate extending between the two longitudinal beams and connected to an intermediate portion of each of the longitudinal beams, the carriage further including two drawer slide assemblies, each having a guide channel rigidly connected to one of the transverse beams, the guide channel extending parallel to the transverse beam to which it is connected, and each having a sliding channel which rides on ball bearings within the guide channel to slide along the extension thereof from a position in which the sliding channel is generally congruent with the guide channel to a position in which the sliding channel extends substantially out from the guide channel, and the carriage including a lower structure made up of four structural columns of generally equal length disposed perpendicular to the base, each structural column rigidly connected to the upper structure proximate to a respective juncture of longitudinal and transverse beams so as to vertically space the upper structure from the base and to transfer a load borne by the upper structure to the base when the upper structure is in the transport position;

a platform disposed substantially parallel to the upper structure, the platform having a generally triangular outer perimeter and a rigid frame that includes two generally parallel longitudinal members, two generally parallel outer transverse members, and two generally parallel inner transverse members, the outer transverse members being disposed perpendicularly to the longitudinal members and the extremities thereof to form with the longitudinal members the generally rectangular outer perimeter of the platform, the inner transverse members being disposed perpendicularly to the longitudinal members and at positions intermediate thereof to form with portions of the longitudinal members a generally inner rectangular perimeter, and each more adjacent outer transverse member and inner transverse member forming with other portions of the longitudinal members a generally rectangular wing perimeter, the platform also having a transverse facing plate rigidly edge-mounted to, extending the length of, and projecting downwardly from each inner transverse member, each transverse facing plate extending adjacent and rigidly mounted to a sliding channel so that the platform is movable between a retracted position in which the sliding channels are generally congruent with the guide channels and a presenting position in which the sliding channels extend substantially out from the guide channels;

a scissors jack including base bracket means anchored rigidly to the base and adapted to project upwardly from the base, carriage bracket means anchored rigidly to the bearing plate of the carriage and adapted to project downwardly from the carriage, a jack screw pivotal about its axis of extension and having threads extending substantially along its length, at least one thread-driven member into which the jack screw is received and which engages the threads of the jack screw so that the thread-driven member is displaced along the extension of the screw when the jack screw pivots, at least one bearing member through which the jack screw extends, and a pair of scissors assembly juxtaposed diametrically with respect to the jack screw, each scissors assembly having four legs of equal length, each of the legs having a displacement end and a gear end which includes gear teeth, two legs of each assembly being driving legs which have their displacement ends pivotally connected to the thread-driven member, and two of each assembly being driven legs which have their displacement ends pivotally connected to the bearing member, and the gear teeth on the driving legs being interlaced with gear teeth on the driven legs, with one of the driving legs and one of the driven legs of each assembly having their respective gear ends pivotally connected to the base bracket means and one of the driving legs and one of the driven legs of each assembly having their respective gear ends pivotally connected to the carriage bracket means;

a jack-driving pulley mounted on the jack screw to cause the jack screw to pivot concomitantly with the rotation of the jack-driving pulley;

a reversible electric motor having a pivotal drive shaft;

a drive pulley mounted on the drive shaft of the reversible electric motor;

a mounting plate rigidly connected to the bearing member of the jack screw, the mounting plate mounting the motor adjacent the bearing member;

an endless drive belt connecting the drive pulley to the jack-driving pulley;

means connecting the twelve-volt motor to a battery source in the vehicles; and switch means for actuating the motor to pivot the drive shaft in one rotational direction, when the platform is to be raised, and for actuating the motor to pivot the drive shaft in an opposite direction when the platform is to be lowered.

14. In an automobile having a trunk with a trunk floor, a portable power-operated lift and presenting mechanism as described in claim 13 wherein the platform has a recessed floor covering the area within the generally rectangular inner perimeter, the recessed floor being connected to the underside of the two longitudinal members and two inner transverse members that form the generally inner rectangular perimeter, and wherein the platform has two elevated floors, each covering an area within a wing perimeter and each being connected to the top side of the two longitudinal members, the outer transverse member, and the inner transverse member that form each generally rectangular wing perimeter.

* * * * *